US 7,692,696 B2

(12) United States Patent
Steinberg et al.

(10) Patent No.: US 7,692,696 B2
(45) Date of Patent: Apr. 6, 2010

(54) DIGITAL IMAGE ACQUISITION SYSTEM WITH PORTRAIT MODE

(75) Inventors: Eran Steinberg, San Francisco, CA (US); Adrian Zamfir, Bucharest (RO); Adrian Capata, Bucharest (RO); Peter Corcoran, Claregalway (IE)

(73) Assignee: FotoNation Vision Limited, Galway (IE)

( * ) Notice: Subject to any disclaimer, the term of this patent is extended or adjusted under 35 U.S.C. 154(b) by 951 days.

(21) Appl. No.: 11/319,766

(22) Filed: Dec. 27, 2005

(65) Prior Publication Data

US 2007/0147820 A1    Jun. 28, 2007

(51) Int. Cl.
*H04N 5/262* (2006.01)
(52) U.S. Cl. ...................................... 348/239
(58) Field of Classification Search ............... 348/222.1, 348/239, 208.4
See application file for complete search history.

(56) References Cited

U.S. PATENT DOCUMENTS

| | | | |
|---|---|---|---|
| 4,683,496 A | 7/1987 | Tom | |
| 5,046,118 A | 9/1991 | Ajewole et al. | |
| 5,063,448 A | 11/1991 | Jaffray et al. | |
| 5,109,425 A | 4/1992 | Lawton | |
| 5,130,935 A | 7/1992 | Takiguchi | |
| 5,164,993 A | 11/1992 | Capozzi et al. | |
| 5,329,379 A | 7/1994 | Rodriguez et al. | |
| 5,500,685 A | 3/1996 | Kokaram | |
| 5,504,846 A | 4/1996 | Fisher | |
| 5,534,924 A | 7/1996 | Florant | |
| 5,594,816 A | 1/1997 | Kaplan et al. | |
| 5,621,868 A | 4/1997 | Mizutani et al. | |

(Continued)

FOREIGN PATENT DOCUMENTS

JP     2281879 A2    11/1990

(Continued)

OTHER PUBLICATIONS

European Patent Office, Communication pursuant to Article 94(3) EPC for EP Application No. 06776529.7, dated Jan. 30, 2008, 3 pages.

(Continued)

*Primary Examiner*—Jason Chan
*Assistant Examiner*—Joel Fosselman
(74) *Attorney, Agent, or Firm*—Andrew V. Smith

(57) ABSTRACT

A digital image acquisition system having no photographic film comprises an apparatus for capturing digital images and a flash unit for providing illumination during image capture. The system has a portrait mode for generating an image of a foreground object against a blurred background, the portrait mode being operable to capture first, second and third images (A, B and C) of nominally the same scene. One of the first and second images (A, B) is taken with flash and the other is taken without flash, and the third image (C) is blurred compared to the first and second images. The portrait mode is further operable to determine foreground and background regions of the scene using the first and second images (A, B), and to substitute the blurred background of the third image (C) for the background of an in-focus image of the scene. In one embodiment the in-focus image is one of the first and second images. In another embodiment the in-focus image is a fourth image.

16 Claims, 3 Drawing Sheets

U.S. PATENT DOCUMENTS

| | | | |
|---|---|---|---|
| 5,724,456 A | 3/1998 | Boyack et al. | |
| 5,812,787 A | 9/1998 | Astle | |
| 5,844,627 A | 12/1998 | May et al. | |
| 5,878,152 A | 3/1999 | Sussman | |
| 5,880,737 A | 3/1999 | Griffin et al. | |
| 5,949,914 A | 9/1999 | Yuen | |
| 5,990,904 A | 11/1999 | Griffin | |
| 6,005,959 A | 12/1999 | Mohan et al. | |
| 6,008,820 A | 12/1999 | Chauvin et al. | |
| 6,018,590 A | 1/2000 | Gaborski | |
| 6,061,476 A | 5/2000 | Nichani | |
| 6,069,635 A | 5/2000 | Suzuoki et al. | |
| 6,069,982 A | 5/2000 | Reuman | |
| 6,122,408 A | 9/2000 | Fang et al. | |
| 6,198,505 B1* | 3/2001 | Turner et al. | 348/222.1 |
| 6,240,217 B1 | 5/2001 | Ercan et al. | |
| 6,243,070 B1 | 6/2001 | Hill et al. | |
| 6,292,194 B1 | 9/2001 | Powell, III | |
| 6,326,964 B1 | 12/2001 | Snyder et al. | |
| 6,407,777 B1 | 6/2002 | Deluca | |
| 6,483,521 B1 | 11/2002 | Takahashi et al. | |
| 6,526,161 B1 | 2/2003 | Yan | |
| 6,535,632 B1 | 3/2003 | Park et al. | |
| 6,538,656 B1 | 3/2003 | Cheung et al. | |
| 6,577,762 B1 | 6/2003 | Seeger et al. | |
| 6,577,821 B2 | 6/2003 | Malloy Desormeaux | |
| 6,593,925 B1 | 7/2003 | Hakura et al. | |
| 6,631,206 B1 | 10/2003 | Cheng et al. | |
| 6,670,963 B2 | 12/2003 | Osberger | |
| 6,678,413 B1 | 1/2004 | Liang et al. | |
| 6,683,992 B2 | 1/2004 | Takahashi et al. | |
| 6,744,471 B1 | 6/2004 | Kakinuma et al. | |
| 6,756,993 B2 | 6/2004 | Popescu et al. | |
| 6,781,598 B1 | 8/2004 | Yamamoto et al. | |
| 6,803,954 B1 | 10/2004 | Hong et al. | |
| 6,804,408 B1 | 10/2004 | Gallagher et al. | |
| 6,836,273 B1 | 12/2004 | Kadono | |
| 6,842,196 B1 | 1/2005 | Swift et al. | |
| 6,850,236 B2 | 2/2005 | Deering | |
| 6,930,718 B2 | 8/2005 | Parulski et al. | |
| 6,956,573 B1 | 10/2005 | Bergen et al. | |
| 6,987,535 B1 | 1/2006 | Matsugu et al. | |
| 6,990,252 B2 | 1/2006 | Shekter | |
| 7,013,025 B2 | 3/2006 | Hiramatsu | |
| 7,035,477 B2 | 4/2006 | Cheatle | |
| 7,042,505 B1 | 5/2006 | Deluca | |
| 7,054,478 B2 | 5/2006 | Harman | |
| 7,064,810 B2 | 6/2006 | Anderson et al. | |
| 7,081,892 B2 | 7/2006 | Alkouh | |
| 7,102,638 B2 | 9/2006 | Raskar et al. | |
| 7,103,227 B2 | 9/2006 | Raskar et al. | |
| 7,103,357 B2 | 9/2006 | Kirani et al. | |
| 7,149,974 B2 | 12/2006 | Girgensohn et al. | |
| 7,206,449 B2 | 4/2007 | Raskar et al. | |
| 7,218,792 B2 | 5/2007 | Raskar et al. | |
| 7,295,720 B2 | 11/2007 | Raskar | |
| 7,317,843 B2 | 1/2008 | Sun et al. | |
| 7,359,562 B2 | 4/2008 | Raskar et al. | |
| 2001/0000710 A1 | 5/2001 | Queiroz et al. | |
| 2001/0012063 A1 | 8/2001 | Maeda | |
| 2002/0080261 A1* | 6/2002 | Kitamura et al. | 348/349 |
| 2002/0093670 A1 | 7/2002 | Luo et al. | |
| 2002/0180748 A1 | 12/2002 | Popescu et al. | |
| 2002/0191860 A1 | 12/2002 | Cheatle | |
| 2003/0038798 A1 | 2/2003 | Besl et al. | |
| 2003/0052991 A1 | 3/2003 | Stavely et al. | |
| 2003/0103159 A1 | 6/2003 | Nonaka | |
| 2003/0169944 A1 | 9/2003 | Dowski et al. | |
| 2004/0047513 A1 | 3/2004 | Kondo et al. | |
| 2004/0145659 A1 | 7/2004 | Someya et al. | |
| 2004/0201753 A1 | 10/2004 | Kondo et al. | |
| 2004/0208385 A1 | 10/2004 | Jiang | |
| 2004/0223063 A1 | 11/2004 | Deluca et al. | |
| 2005/0017968 A1 | 1/2005 | Wurmlin et al. | |
| 2005/0031224 A1 | 2/2005 | Prilutsky et al. | |
| 2005/0041121 A1 | 2/2005 | Steinberg et al. | |
| 2005/0058322 A1 | 3/2005 | Farmer et al. | |
| 2005/0140801 A1 | 6/2005 | Prilutsky et al. | |
| 2005/0213849 A1 | 9/2005 | Kreang-Arekul et al. | |
| 2005/0271289 A1 | 12/2005 | Rastogi | |
| 2006/0008171 A1 | 1/2006 | Petschnigg et al. | |
| 2006/0039690 A1 | 2/2006 | Steinberg et al. | |
| 2006/0104508 A1 | 5/2006 | Daly et al. | |
| 2006/0153471 A1 | 7/2006 | Lim et al. | |
| 2006/0181549 A1 | 8/2006 | Alkouh | |

FOREIGN PATENT DOCUMENTS

| | | |
|---|---|---|
| JP | 4127675 A2 | 4/1992 |
| JP | 6014193 A2 | 1/1994 |
| JP | 8223569 A2 | 8/1996 |
| JP | 10285611 A2 | 10/1998 |
| JP | 20102040 A2 | 4/2000 |
| JP | 20299789 A2 | 10/2000 |
| JP | 21101426 A2 | 4/2001 |
| JP | 21223903 A2 | 8/2001 |
| JP | 22112095 A2 | 4/2002 |
| JP | 23281526 A2 | 10/2003 |
| JP | 24064454 A2 | 2/2004 |
| JP | 24166221 A2 | 6/2004 |
| JP | 24185183 A2 | 7/2004 |
| JP | 26024206 A2 | 1/2006 |
| JP | 26080632 A2 | 3/2006 |
| JP | 26140594 A2 | 6/2006 |
| WO | WO 94/26057 A | 11/1994 |
| WO | WO-02052839 A2 | 7/2002 |
| WO | WO-02089046 A1 | 11/2002 |
| WO | WO-2004017493 A1 | 2/2004 |
| WO | WO-2004036378 A2 | 4/2004 |
| WO | WO-2004059574 A2 | 7/2004 |
| WO | WO-2005015896 A1 | 2/2005 |
| WO | WO-2005076217 A2 | 8/2005 |
| WO | WO-2005099423 A2 | 10/2005 |
| WO | WO 2007/025578 A1 | 3/2007 |
| WO | WO 2007/073781 A1 | 7/2007 |
| WO | WO-2007093199 A2 | 8/2007 |
| WO | WO-2007095477 A2 | 8/2007 |

OTHER PUBLICATIONS

Notification of Transmittal of the International Search Report and the Written Opinion of the International Searching Authority, or the Declaration (PCT/EP2006/007573), dated Nov. 11, 2006.

Braun M. et al.: "Information fusion of Flash and Non-Flash Images." Internet Citation, (online), Dec. 31, 2002, XP002398967 Retrieved from the Internet: URL.http://graphics.stanford.edu/{georgp/vision. htm> [retrieved on Sep. 14, 2006] Section Overview, Section Object Cutout.

Scott, Kelby: "Photoshop Elements 3: Down & Dirty Tricks", Dec. 27, 2004, Peachpit Press, XP002406719, ISBN: 0-321-27835-6, Chapter 1. One Hour Photo: Portrait and studio effects.

Morgan McGuire and Wojciech Matusick and Hanspeter Pfsiter and John F. Hughes and Fredo Durand: "Defocus video matting" SIG-GRAPH 2005 (Online) Jul. 31, 2005, XP002406140 Retrieved from the Internet: URL: http://www.cs.brown.edu/people/morgan/ DefocusVideoMatting/mcg05-DefocusVideoMatting. pdf> (retrieved on Nov. 7, 2006] Section 5 Defocus Composites abstract, Section 3, Overview, figures 1-3,9-12,14-16.

Scott Kelby, "The Photoshop Elements 4 Book for Digital Photographers" Nov. 14, 2005, New Riders, XP002406720, ISBN: 0-321-38483-0, Section: Tagging Images of People (Face Tagging).

Office Action in co-pending European Application No. 06 776 529. 7-2202, entitled "Communication Pursuant to Article 94(3) EPC", dated Sep. 30, 2008, 3 pages.

Adelson, E.H., "Layered Representations for Image Coding, http://web.mit.edu/persci/people/adelson/pub.sub.—pdfs/layers91.pdf.", Massachusetts Institute of Technology. 1991, 20 pages.

Aizawa, K. et al., "Producing object-based special effects by fusing multiple differently focused images, http://rlinks2.dialog.com/NASApp/ChannelWEB/DialogProServlet?ChName=engineering", IEEE trans on circuits and sys for video tech, 2000, pp. 323-330. vol. 10—Issue 2.

Ashikhmin, Michael, "A tone mapping algorithm for high contrast images, http://portal.acm.org/citation.cfm?id=581 91 6and,coll=Portalanddl=ACMandCFID=1 7220933andCFTOKEN=89149269", ACM International Conference Proceeding Series, Proceedings of the 13th Eurographics workshop on Rendering, 2002, pp. 145-156, Vol. 28.

Barreiro, R.B. et al., "Effect of component separation on the temperature distribution of the cosmic microwave background", Mo. Notices of The Royal Astronomical Soc., Current Contents Search®. Dialog® File No. 440 Accession No. 23119677, 2006, pp. 226-246, vol. 368—Issue 1.

Beir, Thaddeus, "Feature-Based Image Metamorphosis," In Siggraph '92, Silicon Graphics Computer Systems, 2011 Shoreline Blvd, Mountain View CA 94043, http://www.hammerhead.com/thad/thad.html. cited by other.

Benedek, C. et al., "Markovian framework for foreground-background-shadow separation of real world video scenes, Proceedings v 3851 LNCS 2006, Ei Compendex®. Dialog® File No. 278 Accession No. 11071345", 7th Asian Conference on Computer Vision, 2006.

Boutell, M. et al., "Photo classification by integrating image content and camera metadata", Pattern Recognition, Proceedings of the 17th International Conference, 2004, pp. 901-904, vol. 4.

Chen, Shenchang et al., "View interpolation for image synthesis, ISBN:0-89791-601-8, http://portal.acm.org/citation.cfm?id=166153andcoli=GUIDEanddl=GUIDEandCFID=680-9268andCFTOKEN=82843223.", Intl Conf on Comp Graphics and Interactive Techniques, Proc of the 20th annual conf on Computer graphics and interactive techniques. 1993. pp. 279-288, ACM.

Eissemann, E. et al., "Flash Photography Enhancement via Intrinsic Relighting", ACM Transactions on Graphics, 2004, pp. 673-678, vol. 23—Issue 3.

Eissemann, E. et al., "Flash Photography Enhancement via Intrinsic Relighting, ACM Transactions on URL: http://graphics.stanford.edu/{georgp/vision.htm", 2002, pp. 1-12.

Eriksen, H.K. et al., "Cosmic microwave background component separation by parameter estimation, INSPEC. Dialog® File No. 2 Accession No. 9947674", Astrophysical Journal. 2006. pp. 665-682, vol. 641—Issue 2.

European Patent Office, extended European Search Report for EP application No. 07024773.9, dated Jun. 3, 2008, 5 pages.

Favaro, P., "Depth from Focus/Defocus, Internet Citation, [Online] Jun. 25, 2002, XP002398665 Retrieved from the Internet: URL:http://homepages.inf.ed.ac.uk/rbf [retrieved on Sep. 12, 2006]", 2002.

Haneda, E., "Color Imaging XII: Processing, Hardcopy, and Applications", Proceedings of Society of Optical Engineers, 2007, vol. 6493.

Hashi Yuzuru et al., "A New Method to Make Special Video Effects. Trace and Emphasis of Main Portion of Images, Japan Broadcasting Corp., Sci. and Techical Res. Lab., JPN, Eizo Joho Media Gakkai Gijutsu Hokoku, http://rlinks2.dialog.com/NASApp/ChannelWEB/DialogProServlet?ChName=engineering", 2003, pp. 23-26, vol. 27.

Heckbert, Paul S., "Survey of Texture Mapping, http://citeseer.ist.psu.edu/135643.html", Proceedings of Graphics Interface '86. IEEE Comp Graph and Apps, 1986, pp. 56-67 & 207-212.

Homayoun Kamkar-Parsi, A., "A multi-criteria model for robust foreground extraction, http://portal.acm.org/citation.cfm?id=1099410andcoll=Porialanddl=ACMandCFID=17220933andCFTOKEN=89149269", Proceedings of the third ACM international workshop on Video surveillance and sensor networks, 2005, pp. 67-70, ACM Press.

Jin, Hailin et al., "A Variational Approach to Shape from Defocus, {ECCV} (2), http://citeseerist.psu.edu/554899.html", 2002, pp. 18-30.

Jin, J., "Medical Imaging, Image Processing, Murray H. Loew, Kenneth M. Hanson, Editors", Proceedings of SPIE, 1996, pp. 864-868, vol. 2710.

Khan, E.A., "Image-based material editing, http://portal.acm.org/citation.cfm?id=1141937andcoll=GUIDEanddl=GUIDEandCFID=68-09268andCFTOKEN=82843223", International Conference on Computer Graphics and Interactive Techniques, 2006, pp. 654 663, ACM Press.

Komatsu, Kunitoshi et al., "Design of Lossless Block Transforms and Filter Banks for Image Coding, http://citeseerist.psu.edu/komatsu99design.html".

Leray et al., "Spatially distributed two-photon excitation fluorescence in scattering media: Experiments and timeresolved Monte Carlo simulations", Optics Comm, 2007, pp. 269-278, vol. 272—Issue 1.

Leubner, Christian, "Multilevel Image Segmentation in Computer-Vision Systems, http://citeseerist.psu.edu/565983.html".

Li, Han et al., "A new model of motion blurred images and estimation of its parameter", Acoustics, Speech, and Signal Processing, IEEE Intl. Conf. on ICASSP '86, 1986, pp. 2447-2450, vol. 11.

Li, Liyuan et al., "Foreground object detection from videos containing complex background, http//portaL.acm.org/citation.cfm?id=957017andcoll= Portalanddl=ACMandCFI D=17220933andCFTCKE N=89149269", Proceedings of the eleventh ACM international conference on Multimedia, 2003, pp. 2-10, ACM Press.

Li, S. et al., "Multifocus image fusion using artificial neural networks, DOI= http://dx.doi.org/ 10.1016/S0167-8655(02)00029-6", Pattern Recogn. Lett. 2002, pp. 985-997, vol. 23.

McGuire, M. et al., "Defocus video matting, DO1= http://doi.acm.org/10.1145/1073204.1073231", ACM Trans. Graph., 2005, pp. 567-576, vol. 24—Issue 3.

Neri, A. et al., "Automatic moving object and background separation Ei Compendex®. Dialog® File No. 278 Accession No. 8063256", Signal Processing, 1998, pp. 219-232, vol. 66-Issue 2.

Pavlidis Tsompanopoulos Papamarkos, "A Multi-Segment Residual Image Compression Technique" http://citeseerist.psu.edu/554555.html.

PCT International Search Report, PCT/US2007/068190, dated Sep. 29, 2008, 4 pages.

PCT Notification of Transmittal of the International Search Report and the Written Opinion of the International Searching Authority, or the Declaration for PCT application No. PCT/EP2006/008229, dated Jan. 14, 2008, 18 pages.

PCT Notification of Transmittal of the International Search Report and the Written Opinion of the International Searching Authority, or the Declaration for PCT application No. PCT/US2007/061956, dated Mar. 14, 2008, 9 pages. cited by other.

PCT Notification of Transmittal of the International Search Report and the Written Opinion of the International Searching Authority, or the Declaration, for PCT Application No. PCT/EP2006/005109, 14 pages.

Petschnigg, G. et al., "Digital Photography with Flash and No Flash Image Pairs", The Institution of Electrical Engineers, 2004, pp. 664-672.

Petschnigg, G. et al., "Digital photography with flash and no-flash image pairs, XP002398974 Database accession No. 8265342, Database Inspec [Online] The Institution of Electrical Engineers, Stevenage, GB; Aug. 2004", 2005, pp. 664-672, vol. 23—Issue 3.

Potmesil, Michael et al., "A lens and aperture camera model for synthetic image generation, ISBN:0-89791-045-1, http://portal.acm.org/citation.cfm?id=806818andcoli=GUIDEanddl=GUIDEandCFID=680-9268andCFTOKEN=82843222.", International Conference on Computer Graphics and Interactive Techniques, Proceedings of the 8th annual conference on Computer graphics and interactive techniques, 1981, pp. 297-305, ACM Press.

Rajagopalan, A.N. et al., "Optimal recovery of depth from defocused images using an mrf model, http://citeseer.ist.psu.edu/rajagopalan98optimal.html", in Proc. International Conference on Computer Vision. 1998, pp. 1047-1052.

Reinhard, E. et al., "Depth-of-field-based alpha-matte extraction, http://doi.acm.org/10.1145/1080402.1080419", in Proceedings of the 2nd Symposium on Applied Perception in Graphics and Visualization, 2005, pp. 95-102. vol. 95.

SA, A. et al., "Range-Enhanced Active Foreground Extraction, XP010851333", Image Processing, IEEE International Conference, 2005, pp. 81-84.

Saito, T. et al., "Separation of irradiance and reflectance from observed color images by logarithmical nonlinear diffusion process, Ei Compendex®. Dialog® File No. 278 Accession No. 10968692", Proceedings of Society for Optical Engineering Computational Imaging IV—Electronic Imaging, 2006, vol. 6065.

Schechner. Y.Y. et al., "Separation of transparent layers using focus. http:I/citeseer.ist.psu.edu/ article/schechner98separation.html", Proc. ICCV, 1998, pp. 1061-1066.

Serrano, N. et al., "A computationally efficient approach to indoor/outdoor scene classification, XP010613491, ISBN: 978-0-7695-1695-0.", Pattern Recognition, 2002 Proceedings. 16th International Conference, IEEE Comput. Soc, 2002, pp. 146-149, vol. 4.

Simard, Patrice Y. et al., "A foreground/background separation algorithm for image compression, Ei Compendex®. Dialog® File No. 278 Accession No. 9897343", Data Compression Conference Proceedings, 2004.

Subbarao, M. et al., "Depth from Defocus: A Spatial Domain Approach, Technical Report No. 9212.03, http://citeseerist.psu.edu/subbarao94depth.html", Computer Vision Laboratory, SUNY.

Subbarao, Murali et al., "Noise Sensitivity Analysis of Depth-from-Defocus by a Spatial-Domain Approach, http://citeseer.ist.psu.edu/subbarao97noise.html".

Sun, J. et al., "Flash Matting", ACM Transactions on Graphics, 2006, pp. 772-778, vol. 25-Issue 3.

Swain C. and Chen T. "Defocus-based image segmentation" in Proceedings ICASSP-95, vol. 4, pp. 2403-2406, Detroit, MI, May 1995, IEEE, http://citeseerist.psu.edu/swain95 defocusbased html.

Szummer, M. et al., "Indoor-outdoor image classification", Content-Based Access of Image and Video Database, Proceedings., IEEE International Workshop, IEEE Comput. Soc, 1998, pp. 42-51.

Television Asia, "Virtual sets and chromakey update: superimposing a foreground captured by one camera onto a background from another dates back to film days, but has come a long way since," Television Asia, vol. 13, No. 9, p. 26, Nov. 2006. Business and Industry®. Dialog® File No. 9 Accession No. 4123327.

Tzovaras, D. et al., "Three-dimensional camera motion estimation and foreground/background separation for stereoscopic image sequences, INSPEC. Dialog® File No. 2 Accession No. 6556637.", Optical Engineering, 1997, pp. 574-579, vol. 36—Issue 2.

U.S. Appl. No. 10/772,767, filed Feb. 4, 2004, by inventors Michael DeLuca, et al.

Utpal, G. et al., "On foreground-background separation in low quality document images, INSPEC. Dialog® File No. 2 Accession No. 9927003", International Journal on Document Analysis and Recognition, pp. 47-63, vol. 8—Issue 1.

Watanabe, Masahiro et al., "Rational Filters for Passive Depth from Defocus", 1995.

Yu, Jingyi et al., "Real-time reflection mapping with parallax, http//portal.acm.org/citation.cfm?id=I 053449andcoll=Portalanddl=ACMandCFID=1 7220933andCFTOKEN=89149269", Symposium on Interactive 3D Graphics, Proceedings of the 2005 symposium on Interactive 3D graphics and games, 2005, pp. 133-138, ACM Press.

Ziou, D. et al., "Depth from Defocus Estimation in Spatial Domain, http://citeseer.ist.psu.edu/ziou99depth.html". CVIU, 2001, pp. 143-165, vol. 81—Issue 2.

* cited by examiner

DIGITAL IMAGE ACQUISITION SYSTEM WITH PORTRAIT MODE

BACKGROUND

1. Field of the Invention

This invention relates to a digital image acquisition system having a portrait mode for generating an image of a foreground object against a blurred background, and a corresponding method.

2. Description of the Related Art

In digital cameras the depth of field (DOF) is typically much greater than for conventional cameras due to the image sensor being somewhat smaller than a 35 mm film negative. This means that portrait images, in particular, will tend to have the background in sharp focus, which may not be desirable as the photographer may wish to emphasize the person's face and de-emphasize the background of the picture. This problem can be corrected by careful photography combined with careful use of camera settings. Alternatively, portrait images are often blurred manually by professional photographers using image processing algorithms. A blurring algorithm may apply various techniques using convolution kernels to create the blurring effects. These effects are normally added on a desktop computer after an image has been captured. This may involve manual intervention and be time-consuming.

US 2003/0052991 discloses to adjust image brightness based on depths of different image features. A digital camera simulates the use of fill flash. The camera takes a series of photographs of a scene at various focus distances. The photographs are stored, along with their corresponding focus distances. The photographs are analyzed to determine distances to objects at various locations of the scene. Regions of a final photograph are selectively adjusted in brightness based on distance information to simulate the effect that would have resulted had fill flash been used.

SUMMARY OF THE INVENTION

There is provided a digital image acquisition system having no photographic film. The system includes an apparatus for capturing digital images and a flash unit for providing illumination during image capture. The system has a portrait mode for generating an image of a foreground object against a blurred background. The portrait mode is operable to capture first, second and third images of nominally the same scene, not necessarily in the order stated. One of the first and second images is taken with flash and the other is taken without flash. The third image is blurred compared to the first and second images. The portrait mode is operable to determine foreground and background regions of the scene using the first and second images, and to substitute the blurred background of the third image for the background of a substantially in-focus image of the scene.

There is further provided a method of generating a digital image of a foreground object against a blurred background. The method includes capturing first, second and third images of nominally the same scene, not necessarily in the order stated. One of the first and second images is taken with flash and the other is taken without flash. The third image is blurred compared to the first and second images. Foreground and background regions of the scene are determined using the first and second images. The blurred background of the third image is substituted for the background of a substantially in-focus image of the scene.

In one embodiment, the substantially in-focus image is one of the first and second images.

In a second embodiment, the substantially in-focus image is a fourth image.

BRIEF DESCRIPTION OF THE DRAWINGS

Embodiments will now be described, by way of example, with reference to the accompanying drawings, in which.

DETAILED DESCRIPTION OF PREFERRED EMBODIMENTS

Figure 1:
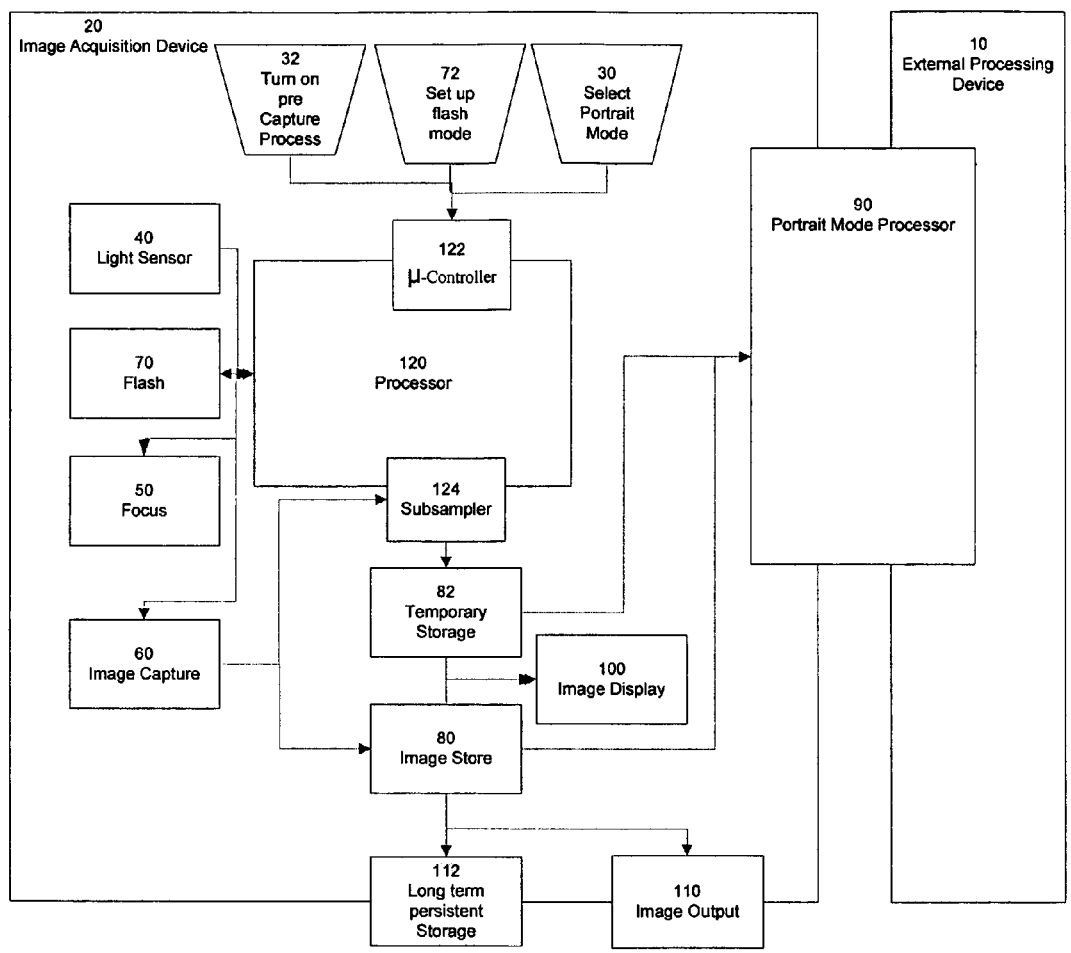
FIG. 1 is a block diagram of a camera apparatus operating in accordance with one embodiment.

FIG. 1 shows a block diagram of an image acquisition device 20 operating in accordance with a preferred embodiment. The digital acquisition device 20, which in the present embodiment is a portable digital camera, includes a processor 120. It can be appreciated that many of the processes implemented in the digital camera may be implemented in or controlled by software operating in a microprocessor, central processing unit, controller, digital signal processor and/or an application specific integrated circuit, collectively depicted as block 120 labelled "processor". Generically, all user interface and control of peripheral components such as buttons and display is controlled by a microcontroller 122. The processor 120, in response to a user input at 122, such as half pressing a shutter button (pre-capture mode 32), initiates and controls the digital photographic process. Ambient light exposure is monitored using light sensor 40 in order to automatically determine if a flash is to be used. A distance to the subject is determined using a focus component 50 which also focuses the image on image capture component 60. If a flash is to be used, processor 120 causes the flash 70 to generate a photographic illumination in substantial coincidence with the recording of the image by image capture component 60 upon full depression of the shutter button. The image capture component 60 digitally records the image in color. The image capture component 60 preferably includes a CCD (charge coupled device) or CMOS to facilitate digital recording. The flash 70 may be selectively generated either in response to the light sensor 40 or a manual input 72 from the user of the camera. The high resolution image recorded by image capture component 60 is stored in an image store 80 which may comprise computer memory such a dynamic random access memory or a non-volatile memory. The camera is equipped with a display 100, such as an LCD, for preview and post-view of images.

In the case of preview images which are generated in the pre-capture mode 32 with the shutter button half-pressed, the display 100 can assist the user in composing the image, as well as being used to determine focusing and exposure. Temporary storage 82 is used to store one or more of the preview images and can be part of the image store 80 or a separate component. The preview image is preferably generated by the image capture component 60. For speed and memory efficiency reasons, preview images preferably have a lower pixel resolution than the main image taken when the shutter button is fully depressed, and are generated by subsampling a raw captured image using software 124 which can be part of the general processor 120 or dedicated hardware or combination thereof. Depending on the settings of this hardware sub-system, the pre-acquisition image processing may satisfy some predetermined test criteria prior to storing a preview image. Such test criteria may be chronological, such as to constantly replace the previous saved preview image with a new captured preview image every 0.5 seconds during the pre-capture mode 32, until the final high resolution image is captured by full depression of the shutter button. More sophisticated criteria may involve analysis of the preview image content, for example, testing the image for changes, before deciding whether the new preview image should replace a previously saved image. Other criteria may be based on image analysis such as sharpness, or metadata analysis such as an exposure condition, whether a flash is going to happen, and/or a distance to the subject.

If test criteria are not met, the camera continues by capturing the next preview image without saving the current one. The process continues until the final high resolution image is acquired and saved by fully depressing the shutter button.

Where multiple preview images can be saved, a new preview image will be placed on a chronological First In First Out (FIFO) stack, until the user takes the final picture. The reason for storing multiple preview images is that the last preview image, or any single preview image, may not be the best reference image for comparison with the final high resolution image in, for example, a red-eye correction process or, in a preferred embodiment, portrait mode processing. By storing multiple images, a better reference image can be achieved, and a closer alignment between the preview and the final captured image can be achieved in an alignment stage discussed later.

The camera is also able to capture and store in the temporary storage 82 one or more low resolution post-view images when the camera is in portrait mode, as will be described. Post-view images are preferably the same as preview images, except that they occur after the main high resolution image is captured.

The camera 20 preferably has a user-selectable portrait mode 30. Alternatively, camera software may include face detection functionality arranged to detect one or more faces in one or more of a series of preview images being captured and if so to switch to portrait mode. In portrait mode, when the shutter button is depressed the camera is caused to automatically capture and store a series of images at close intervals so that the images are nominally of the same scene. The particular number, resolution and sequence of images, whether flash is used or not, and whether the images are in or out of focus, depends upon the particular embodiment, as will be described. A portrait mode processor 90 analyzes and processes the stored images according to a workflow to be described. The processor 90 can be integral to the camera 20—indeed, it could be the processor 120 with suitable programming—or part of an external processing device 10 such as a desktop computer. In this embodiment the processor 90 receives a main high resolution image from the image store 80 as well as one or more pre- or post-view images from temporary storage 82.

Where the portrait mode processor 90 is integral to the camera 20, the final processed image may be displayed on image display 100, saved on a persistent storage 112 which can be internal or a removable storage such as CF card, SD card or the like, or downloaded to another device, such as a personal computer, server or printer via image output component 110 which can be tethered or wireless. In embodiments where the processor 90 is implemented in an external device 10, such as a desktop computer, the final processed image may be returned to the camera 20 for storage and display, or stored and displayed externally of the camera.

Figure 2:
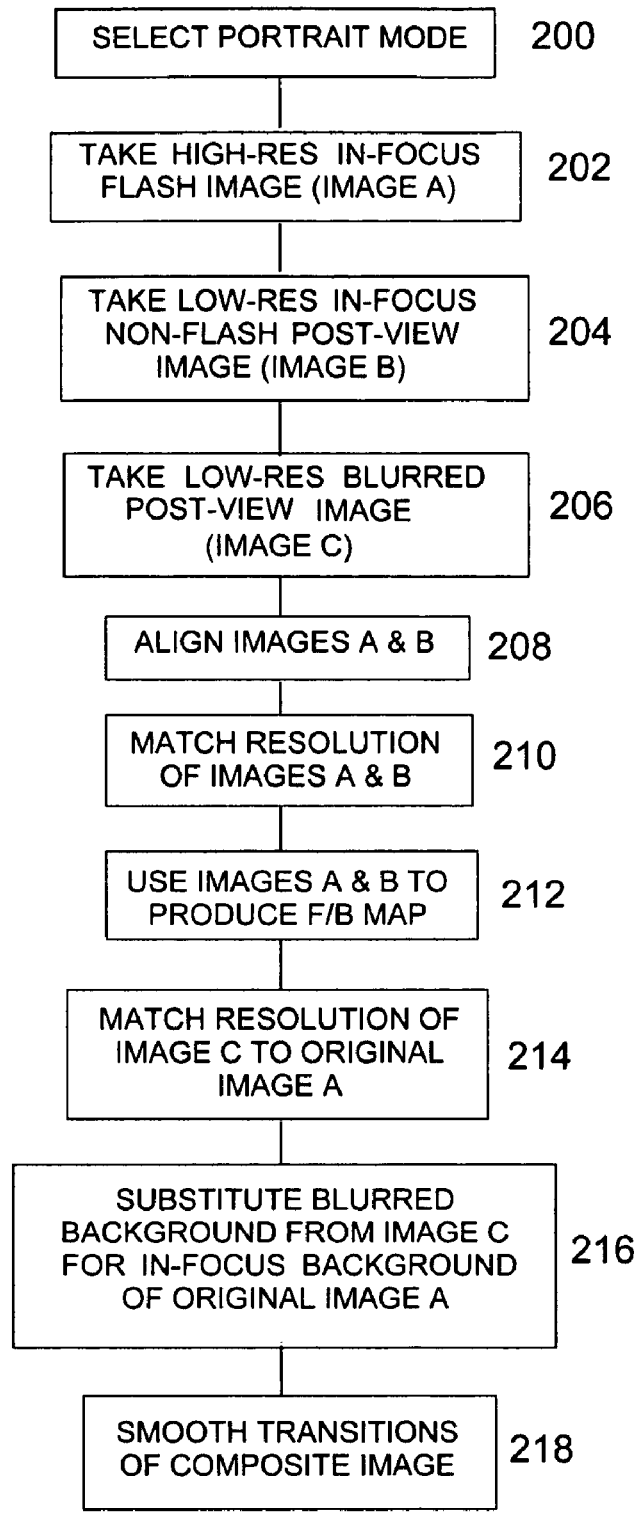
FIG. 2 shows a workflow of a portrait mode processing according to another embodiment.

FIG. 2 illustrates the workflow of a first embodiment of portrait mode processing.

First, portrait mode is selected at 200. Now, when the shutter button is fully depressed, the camera automatically captures and stores three digital images. The first image includes a high pixel resolution, in-focus, flash image of the subject of interest (image A) at 202. This is the main image whose background is to be substituted by a blurred background. The second image includes a low pixel resolution, in-focus, non-flash post-view image (image B), at 204. The third image includes a low pixel resolution, de-focussed (i.e. deliberately blurred) post-view image (image C) at 206.

These three images are taken in rapid succession so that the scene captured by each image is nominally the same. If desired, image A could be taken non-flash and image B taken with flash. In general, one of them is taken with flash and one without. Normally, in portraiture, the main image A would be the flash image but this will depend on other lighting. Image C can be flash or non-flash, but is preferably flash to provide a good contrast between foreground and background. It is to be understood that when we refer to an image being in-focus or blurred we are speaking in relative terms, since no image is perfectly in focus and especially not all over. Thus, by saying that images A and B are in focus we mean that these images, and especially in the case of image A and its background, are substantially more in focus than image C.

At 200 to 206 of FIG. 2 the just-described preferably take place in the camera 20. The remaining steps now to be described can take place in the camera 20 or in an external device 10.

Images A and B are aligned at 208, to compensate for any slight movement in the subject or camera between taking these images. Alignment may be performed globally across entire images or locally using various techniques such as those described in U.S. patent application Ser. No. 11/217,788, filed Aug. 30, 2005, which is assigned to the same assignee as the present application and is hereby incorporated by reference. Then, at 210, the images A and B are matched in pixel resolution by up-sampling image B and/or down-sampling image A. Next, at 212, the flash and non-flash images A and B are used to construct a foreground/background (f/b) map, step 212, which identifies foreground and background regions of the scene captured in the images A, B and C. Processes 208, 210 and 212 are preferably as described in the Ser. No. 11/217,788 application, incorporated by reference above.

At 214, the pixel resolution of blurred low resolution image C is matched to that of the original image A (i.e., as it was before any processing at 208 to 212) by up-sampling image C. Next, using the f/b map constructed at 212, the blurred background from image C is used to replace the background in image A. To speed up this process, blocks of memory from the blurred background image C may be written to the corresponding blocks of image A, rather than replacing on a pixel by pixel basis. Finally, at 218, image processing filters are applied to smooth the transition between the composited foreground and background regions of the composite image resulting from 216.

Variations of the foregoing embodiment are possible. For example, one or both of the images B and C could be pre-view images rather than post-view images. Also, image B and/or image C could be the same resolution as image A. This can serve to avoid matching image resolution at 210 and/or 214.

Figure 3:
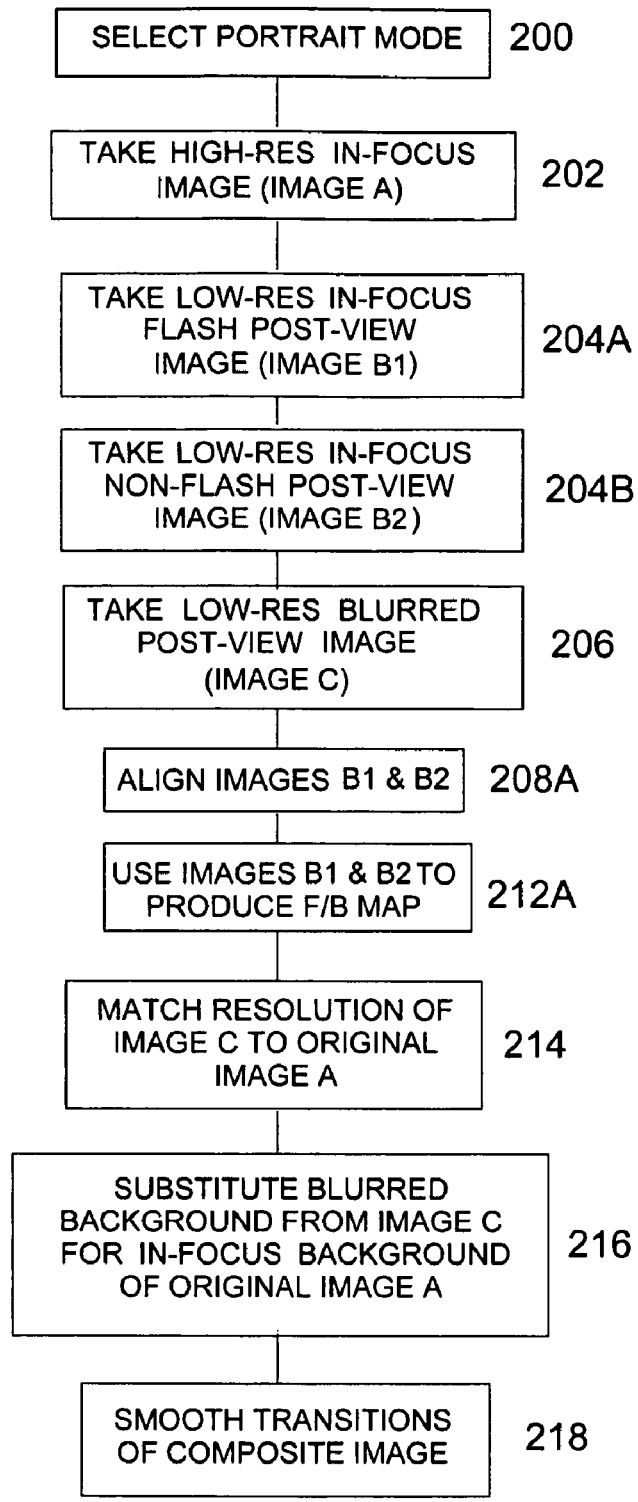
FIG. 3 shows the workflow of the portrait mode processing according to another embodiment.

FIG. 3 illustrates the workflow of a second embodiment of portrait mode processing. Processes which are the same as those in FIG. 2 are given the same reference numerals. Only the differences in the two workflows are described below.

In the embodiment of FIG. 3, upon fully depressing the shutter button the camera takes four images of the same nominal scene in rapid succession. Images A and C (202 and 206) are taken as before, but instead of taking a single image B, two images B1 and B2 are taken, both being low resolution post-view images but one being taken with flash and one without. The two images B1 and B2 are used to construct the f/b map, 208A and 212A according to the principles of the Ser. No. 11/217,788 application, incorporated by reference above, leaving a free choice as to whether the image A is taken with flash or not and avoiding matching image resolution at 210 of FIG. 2.

As before, any one or more of images B1, B2 and C could be a pre-view image, and image C could be the same resolution as image A to avoid matching image resolution at 214.

The present invention is not limited to the embodiments described above herein, which may be amended or modified without departing from the scope of the present invention as set forth in the appended claims, and structural and functional equivalents thereof. In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

What is claimed is:

1. A portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus having a portrait mode for generating in-camera an image of a foreground object against a blurred background, the portrait mode being operable to capture first, second and third images of nominally the same scene, not necessarily in the order stated, one of the first and second images being taken with flash and the other being taken without flash, and the third image being blurred compared to the first and second images, the portrait mode further being operable to determine foreground and background regions of the scene using the first and second images, and to substitute the blurred background of the third image for the background of an in focus image of the scene, thereby generating in-camera a digital image of an in-focus foreground object against a blurred background, wherein the in-focus image comprises one of the first and second images, wherein the first and second images have different pixel resolutions with the in-focus image having the higher resolution, and the apparatus is further configured to determine the foreground and background regions including matching pixel resolutions of the first and second images by at least one of up-sampling the image of lower resolution and sub-sampling the image of higher resolution.

2. A portable apparatus as claimed in claim 1, further being configured to determine the foreground and background regions for aligning two or more of the first, second and third images.

3. A portable apparatus according to claim 1, wherein the image of lower resolution comprises a pre- or post-view image.

4. A portable apparatus as claimed in claim 1, wherein the third image has a lower pixel resolution than the in-focus image.

5. A portable apparatus according to claim 4, wherein the third image comprises a pre- or post-view image.

6. A portable apparatus according to claim 1, wherein said digital image acquisition system comprises a digital camera.

7. A portable apparatus according to claim 1, wherein said digital image acquisition system is a combination of a digital camera and an external processing device.

8. A portable apparatus as claimed in claim 7, wherein portrait mode processing to determine foreground and background regions of the scene using the first and second images and to substitute the blurred background of the third image for the background of a in-focus image of the scene is performed in the external processing device.

9. A portable apparatus according to claim 1 wherein during determination of said foreground and background regions, exposure of the foreground region of the first or second image taken without flash is adjusted to be nominally the same as exposure of foreground region of the other of the first or second image taken with flash.

10. A portable apparatus as claimed in claim 1, in which said portrait mode is manually selectable by said user.

11. A portable apparatus as claimed in claim 1 operable to analyze one or more of said first, second and third images to determine the presence of a face, and responsive to detecting a face for selecting said portrait mode.

12. A portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the portable apparatus having a portrait mode for generating in-camera an image of a foreground object against a blurred background, the portrait mode being operable to capture first, second and third images of nominally the same scene, not necessarily in the order stated, one of the first and second images being taken with flash and the other being taken without flash, and the third image being blurred compared to the first and second images, the portrait mode further being operable to determine foreground and background regions of the scene using the first and second images, and to substitute the blurred background of the third image for the background of an in focus image of the scene, thereby generating in-camera a digital image of an in-focus foreground object against a blurred background, wherein the in-focus image comprises a fourth image captured in the portrait mode, wherein the first and second images have a lower pixel resolution than the fourth image, wherein the first and second images are pre- and/or post-view images, and the apparatus is further configured to provide the image of the in-focus foreground object against the blurred background including matching pixel resolutions of one or more images at the lower resolution of the first and/or second images with the third and/or fourth image by at least one of up-sampling the image of lower resolution and sub-sampling the image of higher resolution.

13. An in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the method comprising:

capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, wherein the in-focus image comprises one of the first and second images, wherein the first and second images have different pixel resolutions with the in-focus image having the higher resolution, and wherein the apparatus is further configured to determine the foreground and background regions including matching pixel resolutions of the first and second images by at least one of up-sampling the image of lower resolution and sub-sampling the image of higher resolution.

14. An in-camera method of generating a digital image of a foreground object against a blurred background within a portable digital image acquisition apparatus having no photographic film (hereinafter "portable apparatus"), the portable adulates comprising a housing that contains an image sensor and a lens for capturing digital images and a flash unit coupled with the housing for providing illumination during image capture, the method comprising:

capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, and wherein the in-focus image comprises a fourth image, and wherein the first and second images have a lower pixel resolution than the fourth image, and wherein the first and second images have a lower pixel resolution than the fourth image, wherein the first and second images are pre- and/or post-view images, and wherein the method further comprises matching pixel resolutions of one or more images at the lower resolution of the first and/or second images with the third and/or fourth image by at least one of up-sampling the image of lower resolution and sub-sampling the image of higher resolution.

15. One or more processor readable storage devices having processor readable code embodied thereon, said processor readable code for programming one or more processors to perform on in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the method comprising: capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, wherein the in-focus image comprises one of the first and second images, wherein the first and second images have different pixel resolutions with the in-focus image having the higher resolution, and wherein the apparatus is further configured to determine the foreground and background regions including matching pixel resolutions of the first and second images by at least one of up-sampling the image of lower resolution and sub-sampling the image of higher resolution.

16. One or more processor readable storage devices having processor readable code embodied thereon, said processor readable code for programming one or more processors to perform an in-camera method of generating a digital image of a foreground object against a blurred background within a portable digital image acquisition apparatus having no photographic film (hereinafter "portable apparatus"), the portable apparatus comprising a housing that contains an image sensor and a lens for capturing digital images and a flash unit coupled with the housing for providing illumination during image capture, the method comprising:

capturing with said portable apparatus first, second and third images of nominally the same scene, not necessarily in the order stated, one of the first and second images being taken with flash and the other being taken without flash, and the third image being blurred compared to the first and second images, determining foreground and background regions of the scene using the first and second images, and substituting the blurred background of the third image for the background of an in focus image of the scene, thereby generating in-camera a digital image of an in-focus foreground object against a blurred background, and wherein the in-focus image comprises a fourth image, wherein the first and second images have a lower pixel resolution than the fourth image, wherein the first and second images are pre- and/or post-view images, and wherein the method further comprises matching pixel resolutions of one or more images at the lower resolution of the first and/or second images with the third and/or fourth image by at least one of up-sampling the image of lower resolution and sub-sampling the image of higher resolution.

* * * * *